United States Patent
Kikugawa

(10) Patent No.: US 6,438,632 B1
(45) Date of Patent: Aug. 20, 2002

(54) ELECTRONIC BULLETIN BOARD SYSTEM

(75) Inventor: Satoru Kikugawa, Setagaya-ku (JP)

(73) Assignee: Gala Incorporated, Tokyo (JP)

( * ) Notice: Subject to any disclaimer, the term of this patent is extended or adjusted under 35 U.S.C. 154(b) by 0 days.

(21) Appl. No.: 09/423,599

(22) PCT Filed: Mar. 10, 1999

(86) PCT No.: PCT/JP99/01162

§ 371 (c)(1),
(2), (4) Date: Nov. 9, 1999

(87) PCT Pub. No.: WO99/46683

PCT Pub. Date: Sep. 16, 1999

(30) Foreign Application Priority Data

Mar. 10, 1998 (JP) ............................................. 10-058578

(51) Int. Cl.[7] .............................................. G06F 13/00
(52) U.S. Cl. ........................ 710/100; 709/204; 709/205; 709/206; 709/207; 709/225; 707/530; 713/200
(58) Field of Search ........................ 710/100, 305–317; 709/204–207, 225; 707/530–541; 713/200–202

(56) References Cited

U.S. PATENT DOCUMENTS

| | | | | |
|---|---|---|---|---|
| 5,377,354 A | * | 12/1994 | Scannell et al. | 706/45 |
| 5,619,648 A | * | 4/1997 | Canale et al. | 709/206 |
| 5,706,507 A | * | 1/1998 | Schloss | 345/700 |
| 5,832,212 A | * | 11/1998 | Cragun et al. | 713/202 |
| 5,835,722 A | * | 11/1998 | Bradshaw et al. | 709/217 |
| 5,884,033 A | * | 3/1999 | Duvall et al. | 709/206 |
| 6,065,056 A | * | 5/2000 | Bradshaw et al. | 709/217 |

FOREIGN PATENT DOCUMENTS

| | | |
|---|---|---|
| JP | 59-094131 | 5/1984 |
| JP | 4-213258 | 8/1992 |
| JP | 5-227203 | 9/1993 |
| JP | 8-083286 | 3/1996 |
| JP | 9-294139 | 11/1997 |
| JP | 10-63592 | 3/1998 |
| JP | 10-133762 | 5/1998 |
| JP | 10-240649 | 9/1998 |
| JP | 10-275157 | 10/1998 |

OTHER PUBLICATIONS

"Unix User", vol. 6, No. 4, pp. 85–93 Apr. 1, 1997.

* cited by examiner

Primary Examiner—Rupal Dharia
(74) Attorney, Agent, or Firm—Arter & Hadden LLP

(57) ABSTRACT

A message desired to be posted on an electronic bulletin board sent from a user's computer is checked with a posting-prohibited word list and a heed-required word list. In the posting-prohibited word list, words previously selected as those inadequate to be posted are registered. In the heed-required list, words previously selected as those to be heeded about the social reaction even though the message is allowed to be posted are registered. When the message desired to be posted includes no posting-prohibited word, the message is posted on an electronic bulletin board. When the message includes any heed-required word, the posting of the message is reported to an operation manager computer. When the message includes any posting-prohibited word, a letter screen indicating that the message cannot be posted is sent to the user s computer which has sent the message, and the operation manager computer is informed of the rejection of the posting.

9 Claims, 5 Drawing Sheets

Fig.3

> Due to the reason that the following words considered to be inadequate for posting are included in your posting-desired message, registration was rejected.
>
> Words to be reasons for rejection of resistration:
>
> ○○○○○○○
> △△△△△△

Fig.4

> Dear system manager
>
> Due to the reason that the following posting-prohibited words were included in the message sent from the user ××××(E-mail:xxx@yyy.co.jp)at the time of ◎ : ●, posting was rejected on the electronic bulletin board.
>                     Electronic Bulletin Board System
>
> Posting-prohibited words included in the message:
>
> ○○○○○○○
> △△△△△△

Fig.5

> Dear system manager
>
> Following heed-required words were included in the message sent from the user ××××(E-mail:xxx@yyy.co.jp)at the time of ◎ : ●.
>                     Electronic Bulletin Board System
>
> Heed-required words included in the message:
>
> ◇◇◇◇◇◇◇

Processing flow when a user contributes a message to a bulletin board managed by a bulletin board manager

ELECTRONIC BULLETIN BOARD SYSTEM

FIELD OF THE INVENTION

The present invention relates to an electronic bulletin board system operated on a network, more particularly to an information processing technology which checks contents of a message to be posted on the electronic bulletin board automatically and in advance, and reports checking results to an operation manager of the electronic bulletin board automatically.

BACKGROUND OF THE INVENTION

The electronic bulletin board system has been used widely in the world of personal computer communications and the Internet. The electronic bulletin board system is managed by a server computer which is managed by a managing company, and the server computer stores a message sent through a network in a database, and manages it. In addition, the server computer provides contents of the database to a user's computer accessed thereto.

In many current electronic bulletin board systems, a message sent through the network is posted as it is, without checking its contents particularly. Accordingly, a message inadequate to be posted on the electronic bulletin board, for example, the one which speaks ill of other persons or degrades dignity of the electronic bulletin board system may often be posted. This arouses one's interest as a social problem, and speedy countermeasure is required.

In many cases, therefore, an operation manager himself of the electronic bulletin board system frequently checks the posted contents of the electronic bulletin board managed by him by means of reading them through a computer screen. If an inadequate message is posted thereon, the operation manager tries to keep the dignity of the electronic bulletin board by performing an operation in which an operation manager computer accesses a server computer of the electronic bulletin board system to delete such a message and to give a warning to a person who posted the message. This operation is very troublesome, and vast man power is necessary when the server computer manages a large number of electronic bulletin boards. In addition, even though such operations are done with vast man power, it is not always possible to prevent the dignity of the electronic bulletin board from going down caused by the posting of the improper message.

There is a utilization style in which plural users' computers access the electronic bulletin board simultaneously and each user converse with others through letters of their messages posted. This is called "chat", and very popular. Once someone posts an improper message in a chat service, it influences on other persons instantaneously to make more following improper messages posted and posted, often resulting in a disturbance state. If the disturbance state occurs, it not only breaks down the dignity of the electronic bulletin board, but also develops sometimes to a situation that might be carefully considered to prevent an adverse social effect. Even though the operation manager monitors contents of chats by means of watching the electronic bulletin board earnestly, it was not easy to prevent such a disturbance state from occurring. Urgent stop of the operation of the bulletin board is the utmost that the operation manager could do.

DISCLOSURE OF THE INVENTION

The object of the present invention is to provide an electronic bulletin board system which inhibits postings of improper messages automatically and in advance, while keeping natural communications being performed through an electronic bulletin board, and has a function to inform an operation manager of the fact that the improper messages were just ready to be posted.

First Invention

An electronic bulletin board system of the first invention comprises a server computer communicating with user's computers through a network, performing an information mediate between the user's computers by an electronic bulletin board function. The electronic bulletin board system sends out a message registration screen in response to a request from any user's computer; acquires information written on the message registration screen by a person who wishes to post a message from the user's computer; checks the posting-desired message in the information written on the message registration screen, with reference to a post-prohibited word list where a post-prohibited word list including words preliminary selected as those which are inadequate to be posted on an electronic bulletin board are registered; registers the message in the electronic bulletin board when the message includes no word in the post-prohibited word list; and sends out a letter screen saying that the message cannot be posted toward the user's computer which has originated that message when the message includes any word in the post-prohibited word list, and gets a computer of an operation manager of the electronic bulletin board system notified of the event of rejecting the posting of the message.

Second Invention

In the second invention, the electronic bulletin board system according to the first invention manages many electronic bulletin boards which can be individually accessed and provides the electronic bulletin boards to the user's computers; keeps notification addresses of the operating managers, who are composed of many bulletin board managers who sponsor the electronic bulletin boards respectively, and a system manager who manages the server computer including all of these electronic bulletin boards; and sends out a letter screen saying that the message cannot be posted toward the user's computer which has originated that message, and gets computers of the bulletin board managers and the system manager notified of the event that the message is rejected to post, when the message includes any word in the post-prohibited word list.

Third Invention

In the third invention, the electronic bulletin board system according to the second invention is such that the posting-prohibited word list is logically divided into a common word list compiled for all of the electronic bulletin boards and individual word lists compiled individually for individual electronic bulletin boards; and the electronic bulletin board system does not get the computer of the system manager notified, when the posting-prohibited words included in the posting-desired message for a certain electronic bulletin board are not the ones in the common word list but the ones in the individual word list for that electronic bulletin board.

Fourth Invention In the fourth invention, the electronic bulletin board system according to the third invention is such that the electronic bulletin board system communicates with the bulletin board manger computer, and compiles the individual word list of posting-prohibited words for the corresponding electronic bulletin board in response to a request of the bulletin board manager.

Fifth Invention

In the fifth invention, the electronic bulletin board system according to the first invention is such that the electronic bulletin board system prepares a heed-required word list in addition to the posting-prohibited word list, and words previously selected as those to be heeded about a social reaction even though the message is allowed to be posted are registered in the heed-required word list; checks the posting-desired message with reference to the heed-required word list in addition to the posting-prohibited word list; and gets the computer of the operation manager of the electronic bulletin board system notified of the event of posting the message including the heed-required words on the electronic bulletin board, when the posting-desired message includes any word in the heed-required word list and no word in the posting-prohibited word list.

Sixth Invention

In the sixth invention, the electronic bulletin board system according to the fifth invention gets the computers of the bulletin board manager and the system manager notified of the event that the message including the heed-required words is posted, when the posting-desired message for a certain electronic bulletin board includes any word in the heed-required word list.

Seventh Invention

In the seventh invention, the electronic bulletin board system according to the sixth invention is such that the heed-required word list is logically divided into a common word list compiled for all of the electronic bulletin boards and individual word lists compiled individually for individual electronic bulletin boards; and the electronic bulletin board system does not get the computer of the system manager notified, when the heed-required words included in the posting-desired message for a certain electronic bulletin board are not the ones in the common word list but the ones in the individual word list for that electronic bulletin board.

Eighth Invention

In the eighth invention, the electronic bulletin board system according to the seventh invention communicates with the bulletin board manger computer, and compiles the individual word list of heed-required words for the corresponding electronic bulletin board in response to a request of the bulletin board manager.

Ninth Invention

In the ninth invention, the electronic bulletin board system according to any one of the first to eighth inventions gets the computer of the operation manager notified by sending an electronic mail informing the respective events to the electronic mail address of the corresponding operation manager.

BRIEF DESCRIPTION OF THE DRAWINGS

FIG. 3 is a view showing an example of a screen sent to a user's computer when a posting of the message desired to be posted is rejected in the first embodiment.

FIG. 4 is a view showing an example of an electronic mail informing an operation manager that the posting of the message desired to be posted was rejected in the first embodiment.

FIG. 5 is a view showing an example of an electronic mail informing the operation manager that the posting-desired message includes heed-required words in the first embodiment.

BEST MODE FOR CARRYING OUT THE INVENTION

Figure 1:
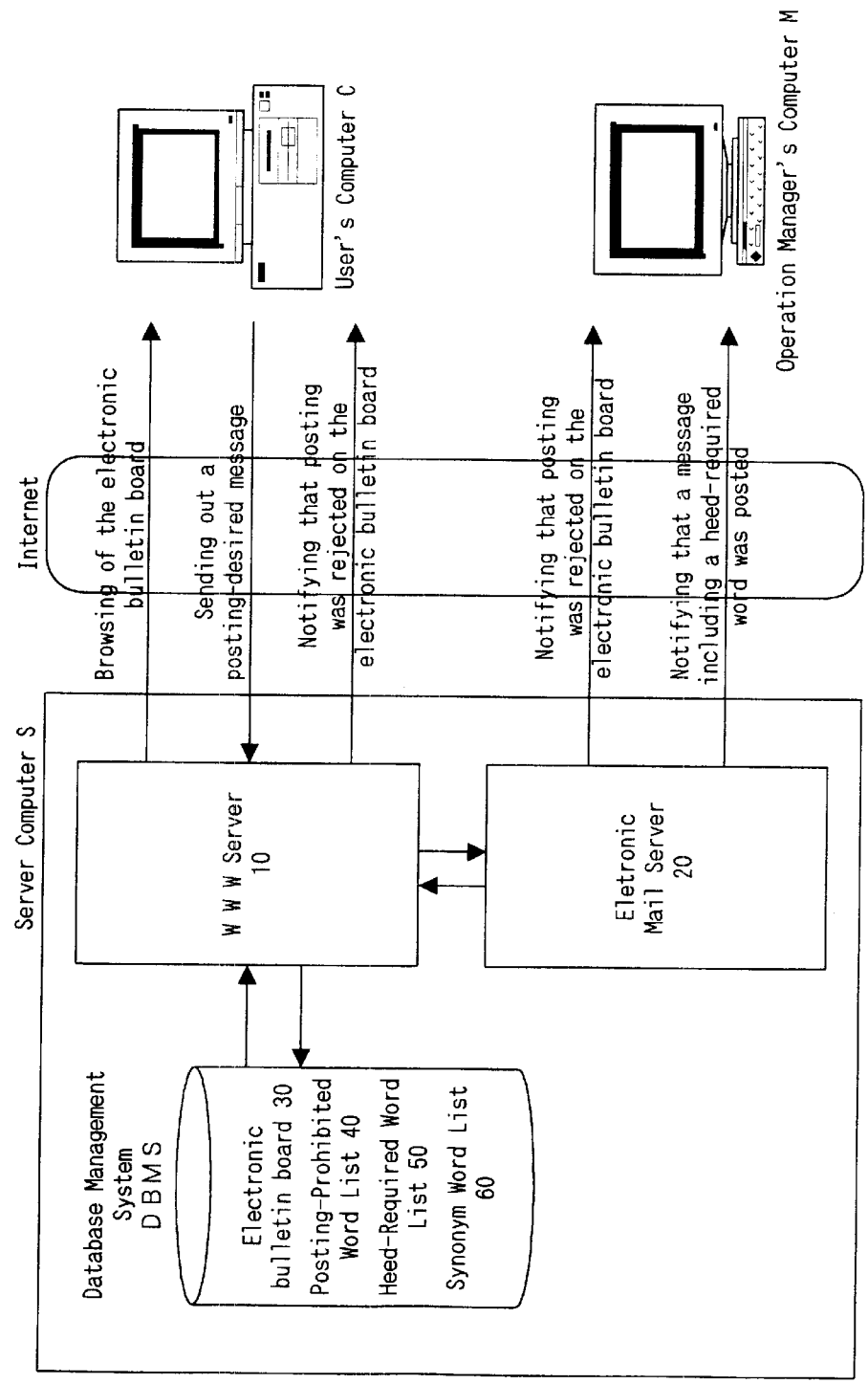
FIG. 1 is a view showing a schematic constitution of an electronic bulletin board system in a first embodiment of the present invention.

System Constitution of First Embodiment and Explanations of Terms

A first embodiment will be described with reference to FIGS. 1 to 5 in detail. The first embodiment includes the foregoing first, fifth and ninth inventions. Terms used in the following descriptions will be explained together with these drawings.

[Server Computer S]

A server computer S is the one managing the whole of an electronic bulletin board system. The server computer is connected to the Internet, and serves as a WWW server 10 and an electronic mail server 20.

[User's Computer C]

User's computers C are the ones which are operated by users, scattered over a wide area and connected to the Internet. The user registers and reads a message by the relevant user's computers.

[Operation Manager Computer M]

An operation manager computer M is the one which performs maintenance on software which operates on the server computer S. The operation manager computer M is connected to the Internet, and an operation manager receives an electronic mail sent to his electronic mail address by this operation manager computer M.

[Electronic Bulletin Board 30]

An electronic bulletin board 30 is a database managed by a database managing system DBMS on the server computer S, and a message sent from the user is stored therein.

[Posting-Prohibited Word List 40]

A posting-prohibited word list 40 is a database managed by a database managing system DBMS on the server computer S, and words previously selected by an operation manager as those inadequate to be posted are registered therein.

[Heed-Required Word List 50]

A heed-required word list 50 is a database managed by a database managing system DBMS on the server computer S, and words previously selected by the operation manager as those to be heeded about the social reaction to the posting of the message on the electronic bulletin board 30 even though the message is allowed to be posted on the electronic bulletin board 30 are registered therein.

[Synonym Word List 60]

A synonym word list 60 is a database managed by a database managing system DBMS, and used at the time of maintenance of the posting-prohibited word list 40 and the heed-required word list 50.

[Posting-Desired Message]

The posting-desired message is the one desired by the user to be posted on the electronic bulletin board. Here, the posting-desired message includes all information such as a body of a message, a title and a handle name (pen name), which is to be opened on the electronic bulletin board.

Registration Processing of Posting-Desired Message

Figure 2:
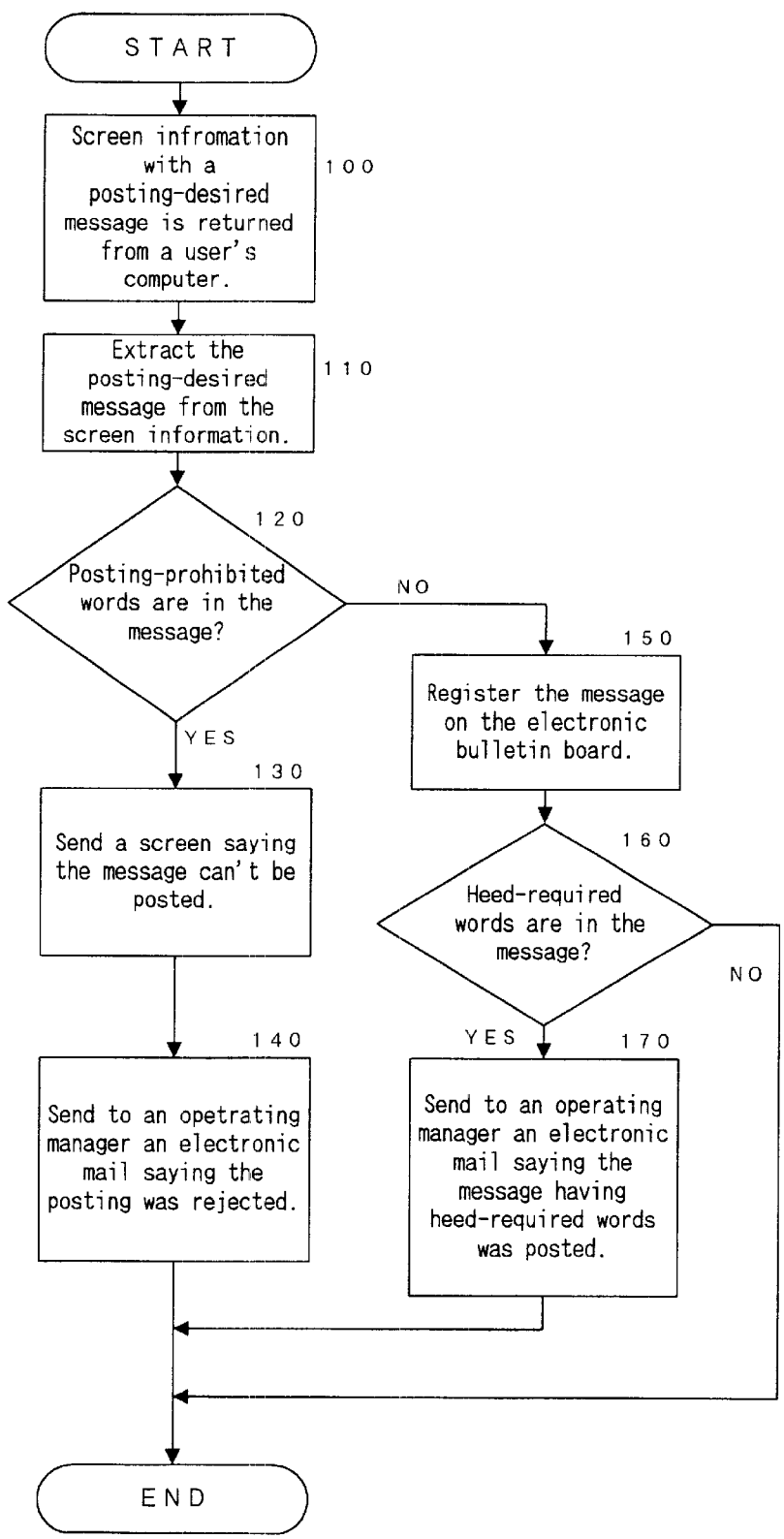
FIG. 2 is a flow chart showing a flow of a registration process of a message desired to be posted in the first embodiment.

A flow of the processing for registering a posting-desired message on the electronic bulletin board is shown in the flow chart in FIG. 2. A user who wishes to post a message on the electronic bulletin board connects a user's computer to the Internet, and sends out a URL (Uniform Resource Locator) of a posting-desired message registration screen. When the user's computer and the Internet are connected to each other, the posting-desired message registration screen is sent to the user's computer C from a server computer S. On this screen, three blanks for "Handle Name","Title"and"Body of Message" are prepared as posting-desired message registration blanks. Furthermore, there are two buttons "Fill-In" and "Reset" below the respective blanks. When matters are filled in these respective blanks and the button "Fill-In"is clicked, the screen information after filling in the posting-desired message is sent back to the server computer S (100).

Word Check with reference to Posting-Prohibited Word List

The server computer S extracts from the sent screen information the posting-desired message filled by the user (110), and examines whether or not the posting-desired message includes words registered in the posting-prohibited word list 40 (120). As a result of the examination, when it is found that the posting-desired message includes the words in the posting-prohibited word list 40, a screen (FIG. 3) saying that the posting-desired message is not allowed to be posted is sent to the user computer C which issued the posting-desired message (130). In addition, an electronic mail (FIG. 4) saying that the posting of the posting-desired message on the electronic bulletin board was rejected is simultaneously sent to an electronic mail address of the operation manager of the electronic bulletin board (140).

Word Check with reference to Heed-Required Word List

On the other hand, when the posting-desired message includes no word in the posting-prohibited word list 40, the relevant posting-desired message is registered in the electronic bulletin board 30 (150). Furthermore, the server computer S examines whether or not the posting-desired message includes the words registered in the heed-required word list 50 (160). As a result of the examination, when it is found that the posting-desired message includes a word in the heed-required word list 50, the server computer S sends an electronic mail (FIG. 5) informing that the posting-desired message including the heed-required words was posted on the electronic bulletin board to the electronic mail address of the operation manager of the electronic bulletin board system (170).

Maintenance of Word Lists

The maintenance of the posting-prohibited word list 40 and the heed-required word list 50 is performed by the operation manage computer. The maintenance of the positing-prohibited word list 40 is described as follows. In this embodiment, since the maintenance of the heed-required word list 50 and the posting-prohibited word list 40 is performed in the completely same procedure, the description for the maintenance of the heed-required word list 50 is omitted.

In the operation manager computer M, maintenance software for the word lists is operated. The maintenance software displays a menu screen on a display of the operation manager computer M, and waits for an operating instruction from the operation manager.

When the operation manager clicks the "Word Registration"button on the menu screen, a word registration screen on which a blank for a word which is desired to be registered is displayed. When the operation manager clicks the "Word Registration" button provided on the screen after he filled in the blank with the word to be registered as a posting-prohibited word, the maintenance software checks whether or not the posting-prohibited word has been already registered in the posting-prohibited word list 40. If this word has not been registered in the posting-prohibited word list 40, the maintenance software registers this word in the posting-prohibited word list 40. On the other hand, if this word has been registered in the posting-prohibited word list 40, a message informing "Already Registered" is displayed on a display.

Next, the maintenance software picks up words analogous to this word from a synonym word list 60, and displays on the display a synonym word list screen in which these words are listed. The "Word Registration" button is prepared on the side of each of the synonym words for each synonym word, which are arranged on the screen. When the operation manager selects a synonym word desired to be registered from the synonym word list screen and clicks the "Word Registration" button corresponding to this synonym word, the synonym word is registered in the posting-prohibited word list 40. At this time, the maintenance software examines, similarly to the foregoing word registration, whether or not the same word as this synonym word has been already registered in the posting-prohibited word list 40, and if the same word as the synonym has not been registered yet in the posting-prohibited word list 40, this word is newly registered in the posting-prohibited word list 40. When the same word as this synonym word has been already registered in the posting-prohibited word list 40, a message informing "Already Registered" is displayed on the display. When a "Word Deletion" button on the menu screen is clicked, a word deletion screen is displayed. A list of words which have been registered in the posting-prohibited word list 40 is displayed in order of the Japanese syllabary. At this time, when a scroll bar prepared in the end of the screen is operated, the screen is scrolled, so that also a portion of the list which was not displayed on the screen can be referred to. When a retrieve word blank of this screen is filled in with a proper retrieve key word, a word list is displayed, in which the words registered in the posting-prohibited word list are rearranged in order of the Japanese syllabary initially beginning from a word corresponding to this key word. Here, a "Delete" button corresponding to each word is provided on the side of each word. When the operation manager clicks the "Delete" button corresponding to a word desired to be deleted, this word is deleted from the posting-prohibited word list 40.

Reading of Message Posted on Electronic Bulletin Board

A user who wishes to read the electronic bulletin board connects the user's computer C to the Internet, and sends out a URL of an electronic bulletin board reading screen. After both of them are connected, the electronic bulletin board reading screen is sent from the server computer S. When the user clicks a "Title List" button provided on this screen, an instruction to request a title list screen of the server computer S is sent out from the user's computer C. Upon receipt of this instruction, the server computer S refers to the electronic bulletin board 30, and returns a title list screen in which a list of message titles rearranged in order from a new one. When the user clicks a certain title on the sent title list screen, an instruction to request a message body screen of the server computer S is sent out from the user's computer C. Upon receipt of this instruction, the server computer S returns a message body screen in which a message corresponding to the title is written.

Two buttons of "Previous Article" and "Next Article" are provided on the upper portion of the message body screen. The user can read through the messages registered in the electronic bulletin board 30 in chronological order. A "Reply" button and a "Delete" button are provided in the lower portion of the message body screen. When the user clicks the "Reply" button, a screen for registering a reply message for this message is sent from the server computer S to the user. The user can register the reply message in this screen in the same manner as the case where the foregoing posting-desired message is registered.

On the other hand, when the user clicks the "Delete" button, a password approval screen for verifying that the user is the person himself who registered the corresponding message is sent from the server computer S. The user enters his password informed beforehand, and sends out this password approval screen to the server computer S. When the password approval screen is sent from the user's computer C, the server computer S verifies whether or not the password is correct. When the server computer S verifies the password to be correct, the server computer S deletes the corresponding message from the electronic bulletin board 30.

Outline of Second Embodiment

In an electronic bulletin board system of the second embodiment, which is more preferred form of the present invention, the electronic bulletin board system manages a large number of electronic bulletin boards which can be accessed individually, and provides them to user's computers, although it was not made to be clear in the explanation of the first embodiment. There are sponsors for the respective electronic bulletin boards, and each electronic bulletin board is managed in accordance with the corresponding sponsor's view.

Although this does not matter to the present invention, in this electronic bulletin board system, sponsors of the electronic bulletin boards are recruited from general users. The general users can sponsor their electronic bulletin boards by answering this recruitment. For example, a user follows the following procedure. The user accesses the server computer S through the Internet by the user's computer, and obtains a WWW page of an application paper for sponsoring the electronic bulletin board. The user writes his personal information (including his electronic mail address) to this page and writes matters such as a view of sponsoring the electronic bulletin board and a title of it, and transmits these matters to the server computer S. An examination for this application is performed by the server computer S, and if this application passes the examination, the applicant is authorized to be a sponsor of the electronic bulletin board. Then, the server computer S reports a management rule of the electronic bulletin board, a bulletin board's URL and a password to the user's computer which is authorized to be the sponsor of the electronic bulletin board.

Figure 6:
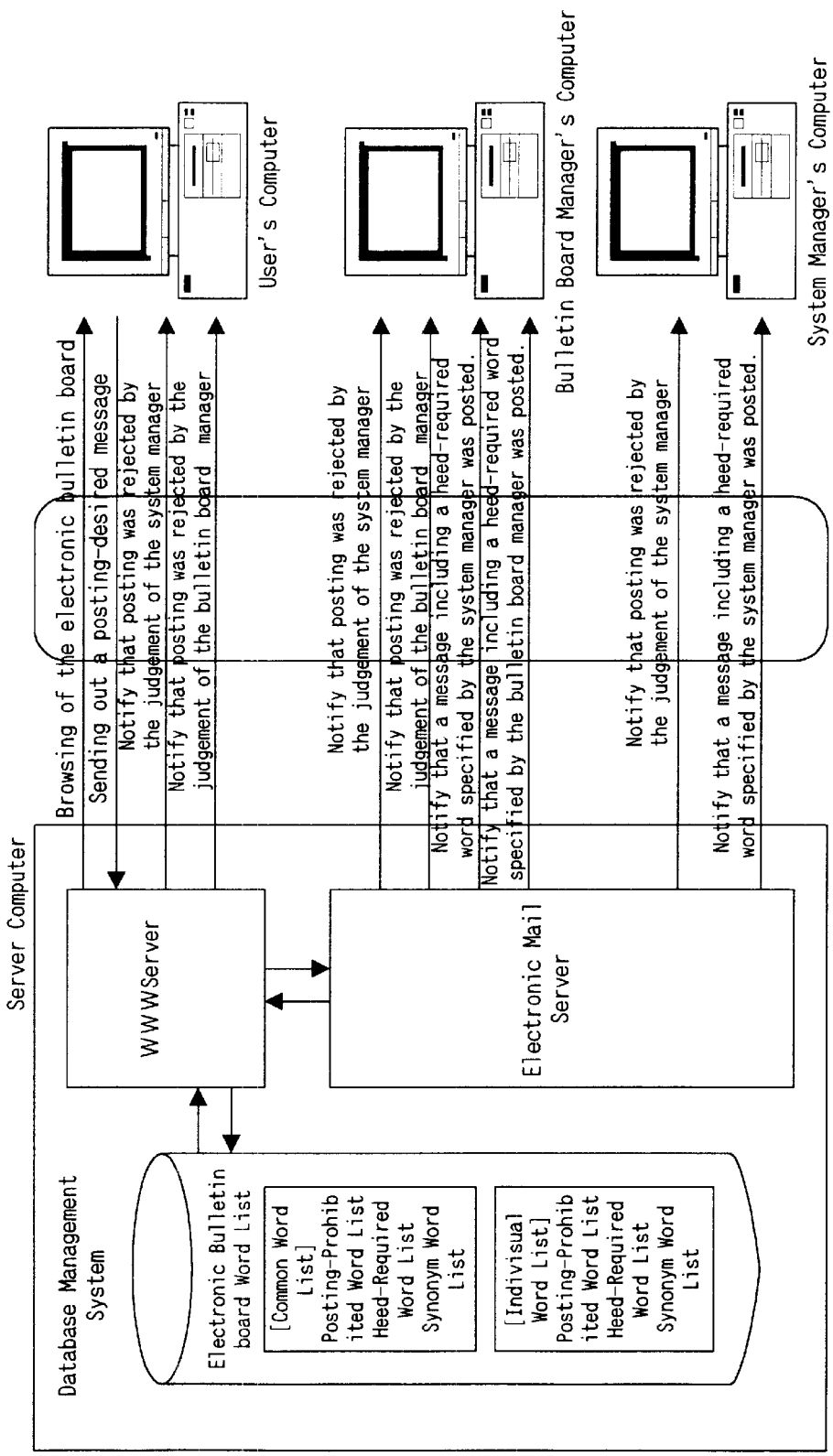
FIG. 6 is a view showing a schematic constitution of an electronic bulletin board in a second embodiment of the present invention.

The user who comes, according to the above described procedure, to manage the electronic bulletin board is hereinafter referred to as an electronic bulletin board manager. The server computer S manages a large number of electronic bulletin boards having different URLs, and each electronic bulletin board has its own manager. The server computer S manages personal information of the electronic bulletin board managers in the form analogous to a name list. Apart from these electronic bulletin board managers, a system manager manages the server computer S including all of the electronic bulletin boards. In the second embodiment, a "system manager" who is a manager of the server computer S and "bulletin board managers"who are sponsors of the individual electronic bulletin boards exist as the persons equivalent to the "operation manager" in the first embodiment. This relation among them is clearly illustrated in FIG. 6.

When a message desired to be posted on a certain electronic bulletin board includes any word in the foregoing posting-prohibited word list, screen data telling that the message cannot be posted is sent to the user's computer which issued the message, and both of said electronic bulletin board managers of the electronic bulletin board's computer and said system manager's computer are informed of the rejection of the posting. Similarly, when the message desired to be posted on the electronic bulletin board includes any word in the heed-required word list, both of said bulletin board managers of the electronic bulletin board's computer and said system manager's computer are informed of the event that the message including the heed-required words was posted.

Common Word List and Individual Word List

In addition, in the second embodiment, the posting-prohibited word list is logically divided into a common word list compiled for all of the electronic bulletin boards and individual word lists compiled individually for individual electronic bulletin boards. When the posting-prohibited words included in the message to be posted on a certain electronic bulletin board are not the ones in said common word list but the ones in said individual word list for the specified electronic bulletin board, the foregoing notification to the system manager computer is not performed. In other words, only the computer of the bulletin board manager of the corresponding electronic bulletin board is informed of the event that the posting of the message was rejected.

Similarly, the heed-required word list is logically divided into a common word list compiled for all of the electronic bulletin boards and individual word lists compiled individually for individual electronic bulletin boards. When heed-required words included in a message to be posted on a certain electronic bulletin board are not the ones in said common word list but the ones in said individual word list for the specified electronic bulletin board, the foregoing notification to the system manager computer is not performed. In other words, only the computer of the bulletin board manager of the corresponding electronic bulletin board is informed of the event that the message including the heed-required words was posted.

Figure 7:
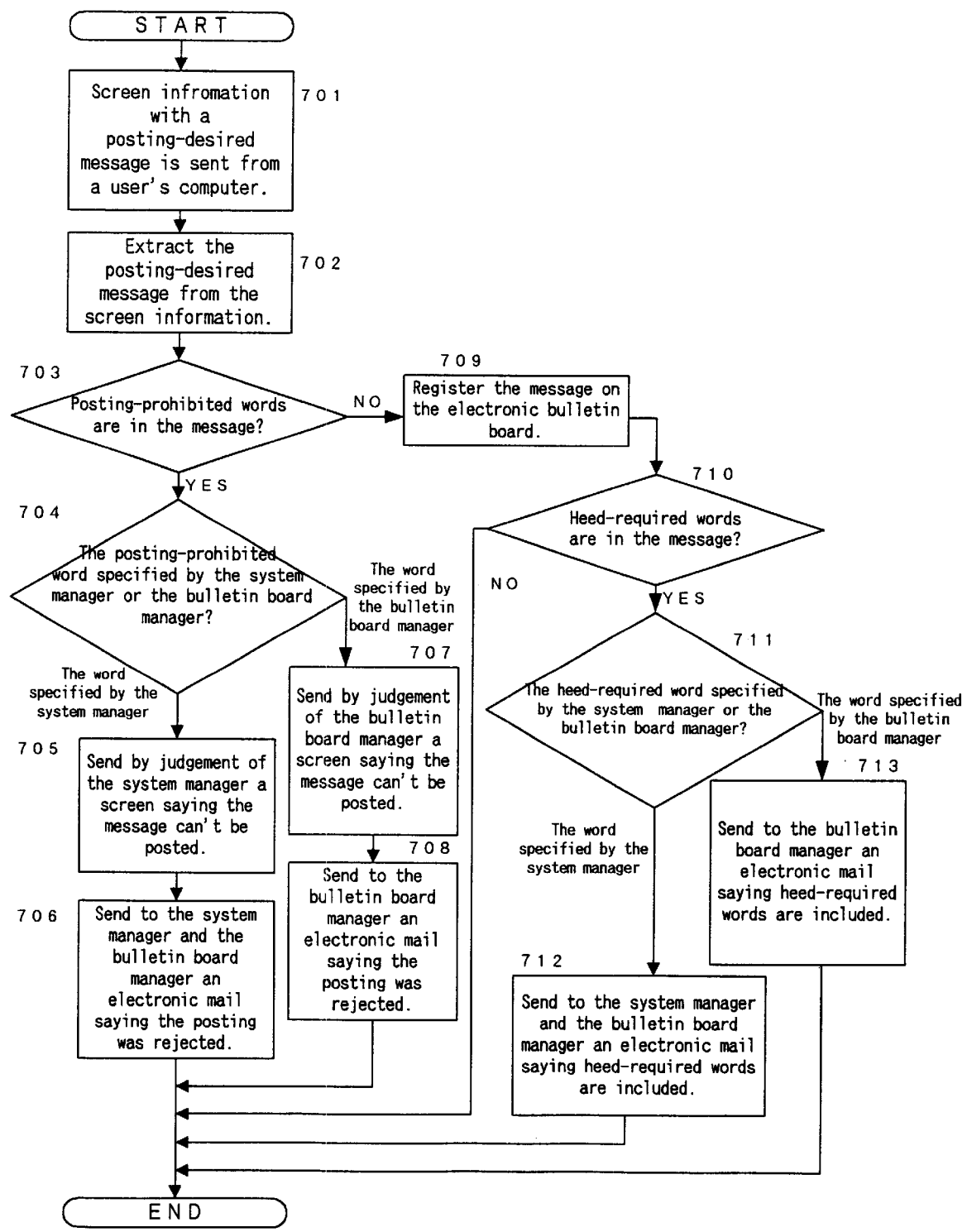
FIG. 7 is a flow chart showing a flow of a registration process of a message desired to be posted in the second embodiment.

These notifications are performed by electronic mails as in the case of the first embodiment. The above described information processing procedure executed by the server computer S is shown in the flowchart of FIG. 7.

Preparation of Individual Word List

The individual word lists composed of the posting-prohibited word lists and the heed-required word lists, which are compiled for the respective electronic bulletin boards, can be prepared freely by the respective electronic bulletin board managers. For example, the following procedure is performed. With the electronic bulletin board manager computer, the electronic bulletin board manager accesses the server computer S through the Internet, thus obtaining a WWW page of compile paper of the posting-prohibited word list and the heed-required word list. In this page, predetermined words of the system about the posting-prohibited word list and the heed-required word list, i.e. common word list, are written by listing them. The electronic bulletin board manager can specify a word to be deleted among words listed up in this common word list. He may fill in a deletion specifying blank with a mark. Moreover, the electronic bulletin board manager can register additional words which are not listed up in the common word list. He may fill in an added word blank with a word to be additionally registered. Information which was filled in here is transmitted to the server computer S by a mechanism of WWW. Upon receipt of this information, an individual word list having a proper logical structure for the specified bulletin board manager is prepared by the server computer S.

Other Applications (a) Databases such as the electronic bulletin board 30, the posting-prohibited word list 40, the heed-required word list 50, and the synonym word list 60 may have structures managed by separated database management systems, each of which independently operates them, or alternatively all of these databases may be constituted so as to be managed by a single database management system like the foregoing embodiment.

(b) The server computer S and the operation manager computer M need not to be fully separated. They may be constituted by a plurality of computers connected to each other by such as a LAN. In this case, it should be preferable to arrange databases and database management systems so that the best state in consideration of performance and cost of the whole of the system is achieved.

(c) In the foregoing embodiment, the electronic mail was used to inform the operation manager of the fact that the posting-desired message includes the posting-prohibited word and the posting of the message on the electronic bulletin board was rejected, or the event that the message using the heed-required word was posted on the electronic bulletin board. However, an electronic bulletin board system may be adopted, in which communications are performed via a LAN by operating the predetermined management software on the operation management computer and the information that the posting was rejected is sequentially displayed on the display of the operation manager's computer.

(d) Although the foregoing electronic bulletin system operates on the Internet, the present invention can be applied also to electronic bulletin board systems which operate in other styles of the network such as personal computer communications. Possibility of application of the present invention does not depend on kinds of the network styles.

(e) The synonym word is not registered in the posting-prohibited word list 40 and the heed-required word list 50 after checking the synonym word at the time of registering the word as the foregoing embodiment, but synonym words of words registered in the posting-prohibited word list 40 and the heed-required word list 50 may be checked at the time of checking the content of the message desired to be posted. By doing so, an operation to register the synonym word in the word list is unnecessary, and moreover, regions for storing a database for the posting-prohibited word list 40 and the heed-required word list 50 are saved.

(f) One of the features of the present invention is embodied in the form that the message desired to be posted is not posted on the electronic bulleting board when this message includes any posting-prohibited word. Here, the event that "the message including any posting-prohibited word is not posted" is synonymous with the event that "the message is not recognized to be posted", for many people who are ordinarily looking at the electronic bulletin board through the network. Accordingly, though the message is physically written on the electronic bulletin board in a range where many people who are ordinarily looking at the electronic bulletin board do not recognize that it is posted, this is substantially the same as that the message is not posted. Although such a processing system is adopted, this system is never out of the scope of the technical concept of the present invention.

Effects of the Invention (1) It is checked automatically whether or not the message desired to be posted includes any word considered to be inadequate for posting, and a message which speaks ill of other persons or degrades dignity of the electronic bulletin board system can be prevented from being posted.

(2) When a message desired to be posted is not posted on the electronic bulletin board, the operation manager is informed of the event that posting was rejected by an electronic mail. Thus, the operation manager can fully seize the processing that has been performed by the electronic bulletin board system, simply by confirming the electronic mail.

(3) The operation manager is informed by electronic mail saying that a message desired to be posted including heed-required words was posted on the electronic bulletin board. The operation manager can utilize this notification as effective data for deciding future handling of the heed-required words in the electronic bulletin board system.

(4) Also in the system which manages many electronic bulletin boards sponsored by many persons, message check reports to the individual electronic bulletin board managers and as well as a check report to the system manager who is a responsible person for all the electronic bulletin boards can reasonably be processed while meeting the object.

(5) Since each bulletin board manager can register posting-prohibited words and heed-required words individually, they can utilize an specific checking and a check report service, which meet objects of the individual electronic bulletin board sponsored by them.

What is claimed is:

1. An electronic bulletin board system comprising a server computer communicating with user's computers through a network, performing an information mediate between the user's computers by an electronic bulletin board function, said electronic bulletin board system:

sending out a message registration screen in response to a request from any user's computer;

acquiring information written on the message registration screen by a person who wishes to post a message from the user's computer;

checking the posting-desired message in said information written on the message registration screen, with reference to a post-prohibited word list where a post-prohibited word list including words preliminary selected as those which are inadequate to be posted on an electronic bulletin board are registered;

registering said message in the electronic bulletin board when the message includes no word in the post-prohibited word list;

sending out a letter screen saying that the message cannot be posted toward the user's computer which has originated that message when the message includes any word in the post-prohibited word list, and getting a computer of an operation manager of said electronic bulletin board system notified of the event of rejecting the posting of said message.

2. The electronic bulletin board system according to claim 1, wherein said electronic bulletin board system manages many electronic bulletin boards which can be individually accessed and provides the electronic bulletin boards to the user's computers;

keeps notification addresses of said operating managers, who are composed of many bulletin board managers who sponsor said electronic bulletin boards respectively, and a system manager who manages the server computer including all of these electronic bulletin boards; and sends out a letter screen saying that the message cannot be posted toward the user's computer which has originated that message, and gets computers of said bulletin board managers and said system manager notified of the event that said message is rejected to post, when the message includes any word in the posting-prohibited word list.

3. The electronic bulletin board system according to claim 2, wherein said posting-prohibited word list is logically divided into a common word list compiled for all of the electronic bulletin boards and individual word lists compiled individually for individual electronic bulletin boards; and said electronic bulletin board system does not get the computer of said system manager notified, when the posting-prohibited words included in the posting-desired message for a certain electronic bulletin board are not the ones in said common word list but the ones in said individual word list for that electronic bulletin board.

4. The electronic bulletin board system according to claim 3, wherein said electronic bulletin board system communicates with said bulletin board manger computer, and compiles said individual word list of posting-prohibited words for the corresponding electronic bulletin board in response to a request of said bulletin board manager.

5. The electronic bulletin board system according to claim 1, wherein said electronic bulletin board system prepares a heed-required word list in addition to said posting-prohibited word list, and words previously selected as those to be heeded about a social reaction even though the message is allowed to be posted are registered in the heed-required word list;

checks the posting-desired message with reference to the heed-required word list in addition to the posting-prohibited word list; and gets the computer of the operation manager of said electronic bulletin board system notified of the event of posting the message including the heed-required words on the electronic bulletin board, when the posting-desired message includes any word in the heed-required word list and no word in the posting-prohibited word list.

6. The electronic bulletin board system according to claim 5, wherein said electronic bulletin board system gets the computers of said bulletin board manager and said system manager notified of the event that the message including the heed-required words is posted, when the posting-desired message for a certain electronic bulletin board includes any word in the heed-required word list.

7. The electronic bulletin board system according to claim 6, wherein said heed-required word list is logically divided into a common word list compiled for all of the electronic bulletin boards and individual word lists compiled individually for individual electronic bulletin boards; and said electronic bulletin board system does not get the computer of said system manager notified, when the heed-required words included in the posting-desired message for a certain electronic bulletin board are not the ones in said common word list but the ones in said individual word list for that electronic bulletin board.

8. The electronic bulletin board system according to claim 7, wherein said electronic bulletin board system communicates with said bulletin board manger computer, and compiles said individual word list of heed-required words for the corresponding electronic bulletin board in response to a request of said bulletin board manager.

9. The electronic bulletin board system according to any one of claims 1 to 8, wherein said electronic bulletin board system gets the computer of said operation manager notified by sending an electronic mail informing the respective events to the electronic mail address of the corresponding operation manager.

* * * * *